(12) United States Patent
Shaffer et al.

(10) Patent No.: US 8,260,338 B2
(45) Date of Patent: Sep. 4, 2012

(54) METHOD AND SYSTEM FOR PROVIDING INTEROPERABLE COMMUNICATIONS WITH DYNAMIC EVENT AREA ALLOCATION

(75) Inventors: Shmuel Shaffer, Palo Alto, CA (US); Shah Talukder, Los Gatos, CA (US); Kittur V. Nagesh, Saratoga, CA (US); Douglas J. Hall, Westerville, OH (US); Larry R. Metzger, Wake Forest, CA (US); Yogesh Kalley, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 885 days.

(21) Appl. No.: 11/365,113

(22) Filed: Feb. 28, 2006

(65) Prior Publication Data

US 2007/0202908 A1    Aug. 30, 2007

(51) Int. Cl.
*H04B 7/00* (2006.01)
(52) U.S. Cl. .................. 455/518; 455/519; 455/521
(58) Field of Classification Search ........... 455/517–521
See application file for complete search history.

(56) References Cited

U.S. PATENT DOCUMENTS

| | | | |
|---|---|---|---|
| 4,359,603 A | 11/1982 | Heaton | 370/267 |
| 4,730,306 A | 3/1988 | Uchida | 370/263 |
| 4,746,924 A | 5/1988 | Lightfoot | |
| 5,048,082 A | 9/1991 | Krafft et al. | 379/406.07 |
| 5,099,510 A | 3/1992 | Blinken et al. | 379/202.01 |
| 5,436,896 A | 7/1995 | Anderson et al. | 370/260 |
| 5,539,741 A | 7/1996 | Barraclough et al. | 370/267 |
| 5,625,407 A | 4/1997 | Biggs et al. | 348/14.11 |
| 6,011,851 A | 1/2000 | O'Connor et al. | 381/17 |
| 6,094,578 A | 7/2000 | Purcell et al. | 455/426 |
| 6,178,237 B1 | 1/2001 | Horn | 379/202.01 |
| 6,185,205 B1 | 2/2001 | Sharrit et al. | 370/389 |
| 6,204,844 B1 * | 3/2001 | Fumarolo et al. | 715/736 |
| 6,233,315 B1 | 5/2001 | Reformato et al. | 379/88.01 |
| 6,327,567 B1 | 12/2001 | Willehadson et al. | 704/270 |
| 6,374,100 B1 | 4/2002 | Smith et al. | 455/419 |
| 6,400,816 B1 | 6/2002 | Hjalmtysson et al. | 379/201.03 |
| 6,404,873 B1 | 6/2002 | Beyda et al. | 379/202.01 |

(Continued)

FOREIGN PATENT DOCUMENTS

CN    2674799 Y    1/2005

(Continued)

OTHER PUBLICATIONS

NetworkFirst Interoperability Solved, Data Sheet, M/A-COM, Inc., ECR-7018A, http://www.networkfirst.com/resources/pdf/NetworkFirstRevised5_03.pdf, 6 pages, May 2003.

(Continued)

*Primary Examiner* — Raymond Dean
(74) *Attorney, Agent, or Firm* — Baker Botts L.L.P.

(57) ABSTRACT

A method for providing interoperable communications with dynamic event area allocation includes facilitating communications of a plurality of virtual talk groups, each virtual talk group including a plurality of endpoints of different communication networks communicating using a respective communication protocol. The method includes receiving notice of an event comprising an event location and creating an event area based on the event location. The method also includes associating an event virtual talk group with the event for communications regarding the event. The method also includes modifying the event area based on at least one location parameter associated with the event.

31 Claims, 3 Drawing Sheets

U.S. PATENT DOCUMENTS

| | | | |
|---|---|---|---|
| 6,408,327 B1 | 6/2002 | McClennon et al. | 709/204 |
| 6,418,214 B1 | 7/2002 | Smythe et al. | 379/202.01 |
| 6,453,022 B1 | 9/2002 | Weinman, Jr. | 379/88.13 |
| 6,501,739 B1 | 12/2002 | Cohen | 370/260 |
| 6,608,820 B1 | 8/2003 | Bradshaw, Jr. | 370/260 |
| 6,728,605 B2 * | 4/2004 | Lash et al. | 701/1 |
| 6,792,092 B1 | 9/2004 | Michalewicz | 379/202 |
| 6,850,496 B1 | 2/2005 | Knappe et al. | 370/260 |
| 6,873,854 B2 | 3/2005 | Crockett et al. | 455/518 |
| 6,882,856 B1 | 4/2005 | Alterman et al. | 455/519 |
| 6,885,874 B2 | 4/2005 | Grube et al. | 455/520 |
| 6,912,389 B2 | 6/2005 | Bright et al. | 455/433 |
| 6,982,961 B2 | 1/2006 | Refai et al. | 370/265 |
| 6,987,480 B1 | 1/2006 | Kotick et al. | 342/41 |
| 6,987,841 B1 | 1/2006 | Byers et al. | 379/88.17 |
| 6,993,120 B2 | 1/2006 | Brown et al. | 379/88.13 |
| 6,996,406 B2 | 2/2006 | Lection et al. | 455/457 |
| 6,999,782 B2 | 2/2006 | Shaughnessy et al. | 455/518 |
| 6,999,783 B2 | 2/2006 | Toyryla et al. | 455/519 |
| 7,003,286 B2 | 2/2006 | Brown et al. | 455/416 |
| 7,006,607 B2 | 2/2006 | Garcia | 379/88.18 |
| 7,010,106 B2 | 3/2006 | Gritzer et al. | 379/202.01 |
| 7,010,109 B2 | 3/2006 | Gritzer et al. | 379/202.01 |
| 7,010,275 B2 | 3/2006 | Davies | 455/90.2 |
| 7,013,279 B1 | 3/2006 | Nelson | 704/270 |
| 7,031,700 B1 | 4/2006 | Weaver et al. | 455/420 |
| 7,035,385 B2 | 4/2006 | Levine et al. | 379/88.23 |
| 7,058,168 B1 | 6/2006 | Knappe et al. | 379/204.01 |
| 7,079,857 B2 | 7/2006 | Maggenti et al. | 455/518 |
| 7,089,005 B2 | 8/2006 | Reddy | |
| 2001/0028321 A1 | 10/2001 | Krasner | 342/357.1 |
| 2002/0013813 A1 | 1/2002 | Matsuoka | 709/204 |
| 2002/0118796 A1* | 8/2002 | Menard et al. | 379/45 |
| 2002/0152305 A1 | 10/2002 | Jackson et al. | 709/224 |
| 2002/0178364 A1 | 11/2002 | Weiss | 713/182 |
| 2003/0100326 A1 | 5/2003 | Grube et al. | 455/515 |
| 2004/0054428 A1 | 3/2004 | Sheha et al. | 700/56 |
| 2004/0070515 A1 | 4/2004 | Burkley et al. | 340/825.49 |
| 2004/0139320 A1 | 7/2004 | Shinohara | 713/168 |
| 2004/0160458 A1* | 8/2004 | Igarashi et al. | 345/660 |
| 2004/0185863 A1 | 9/2004 | Ogami | 455/452.1 |
| 2004/0192353 A1 | 9/2004 | Mason et al. | 455/457 |
| 2004/0249949 A1 | 12/2004 | Gourraud et al. | 709/227 |
| 2005/0048987 A1 | 3/2005 | Glass | |
| 2005/0135348 A1 | 6/2005 | Staack | 370/353 |
| 2005/0174991 A1 | 8/2005 | Keagy | 370/352 |
| 2005/0195774 A1 | 9/2005 | Chennikara et al. | 370/338 |
| 2005/0232207 A1 | 10/2005 | Antoniadis et al. | 370/338 |
| 2005/0265256 A1 | 12/2005 | Delaney | 370/254 |
| 2006/0114847 A1 | 6/2006 | Dssouli et al. | 370/261 |
| 2006/0118636 A1 | 6/2006 | Miles et al. | 235/472 |
| 2006/0165060 A1 | 7/2006 | Dua | 370/352 |
| 2007/0030144 A1 | 2/2007 | Titus et al. | 340/534 |
| 2007/0047479 A1 | 3/2007 | Shaffer et al. | 370/328 |
| 2007/0060144 A1 | 3/2007 | Mills et al. | 455/445 |
| 2007/0104121 A1 | 5/2007 | Shaffer et al. | 370/276 |
| 2007/0105578 A1 | 5/2007 | Shaffer et al. | 455/518 |
| 2007/0105579 A1 | 5/2007 | Shaffer et al. | 455/519 |
| 2007/0115848 A1 | 5/2007 | Chean et al. | 370/252 |
| 2007/0274611 A1 | 11/2007 | Rodriguez et al. | |
| 2008/0037461 A1 | 2/2008 | Biltz et al. | 370/328 |
| 2008/0167049 A1 | 7/2008 | Karr et al. | 455/456 |

FOREIGN PATENT DOCUMENTS

| | | |
|---|---|---|
| WO | WO 01/91485 | 11/2001 |
| WO | WO 02/074051 | 9/2002 |

OTHER PUBLICATIONS

Network Solution:, Information Sheet, NetworkFirst, M/A-COM, Inc., http://www.networkfirst.com/features/solution, 2 pages, Mar. 2003.

ACU-1000™ Interoperability NOW™, Information Sheet, Raytheon JPS Communications, http://www.jps.com/downloads/PDFS/acuupgrade.pdf, 4 pages, Mar. 2004.

Interoperability Gateway, OpenSky, NetworkFirst, P25$^{IP}$, Data Sheet, M/A-COM, Inc. ECR-7054, http://www.opensky.com/network/7054.pdf, 2 pages, May 2003.

C3 Maestro$^{IP}$ Dispatch Console, OpenSky, NetworkFirst, P25$^{IP}$, Data Sheet, M/A-COM, Inc. ECR-7160A, http://www.opensky.com/network/7160.pdf, 2 pages, Oct. 2003.

V$^{IP}$ Dispatch Console, OpenSky, NetworkFirst, P25$^{IP}$, Data Sheet, M/A-COM, Inc. ECR-7241B, http://www.opensky.com/network/7241B.pdf, 2 pages, Oct. 2004.

Cisco IP Interoperability and Collaboration System, Q&A, Copyright © Cisco Systems, Inc. www.cisco.com, 4 pages, Oct. 2005.

Cisco IPICS, Solution Overview, Copyright © Cisco Systems, Inc., www.cisco.com/go/ipics, 6 pages, Oct. 2005.

MRT Urgent Communications: Service, Safety, Security, M/A-Com Emphasizes Power of IP in Seven Announcements at APCO, Aug. 18, 2002, 6 pages. http://mrtmag.com/products/new/radio_macom_emphasizes_power, Aug. 18, 2002.

Jim McKay, Government Technology, "Intact Amid Chaos", Mar. 2005, 2 pages, Mar. 2005.

Ian Hoffman, Oakland Tribune, "Oakland's New Radios Pass Test, City, Regional Agencies Get Green Light to Buy Public-Safety Equipment," 2007, 2 pages (reprinted by Tyco Electronics and available at http://www.macom-wireless.com/news/oaklands%20new%20radios.asp), Mar. 11, 2005.

MRT Urgent Communications: Service, Safety, Security, "5 for '05 Technologies," Dec. 1, 2004, 9 pages. http://mrtmag.com/mag/radio_technologies.

MRT Urgent Communications: Service, Safety, Security, John Facella, "ROIP Success Is in the Details," Dec. 1, 2004, 3 pages. http://mrtmag.com/mag/radio_roip_success_details/.

Ann Imse, Rocky Mountain News, "Radio Breakthrough for Cops, Firefighters," Dec. 10, 2004, 2 pgs.

First Responder Communications, A Supplement to MRT and Fire Chief, "IP Opens Eyes," Aug. 2004, 5 pages.

MRT, Mobile Radio Technology, "IP Evangelist," Apr. 2004, 4 pages, www.iwce-mrt.com.

Ron Bender, et al., MRT; Mobile Radio Technology "Multiple Choices for Critical Communications," Oct. 2001, 4 pages, www.mrtmag.com.

Jay Herther, et al., MRT; Mobile Radio Technology, "Voice-over-Interintranet Protocol for Critical Communications," Aug. 2001, 4 pages, www.mrtmag.com.

What's New in Radio Communications, Aug.-Sep. 2001, vol. 14 No. 1, Inside: Marine Radio, 2 pages, www.westwick-farrow.com.au.

NetworkFirst Interoperability Solved, Data Sheet, M/A-COM, Inc., ECR-7018A, http://www.networkfirst.com/resources/pdf/NetworkFirstRevised5_03.pdf, 6 pages, Apr. 2004.

Network Solution:, Information Sheet, NetworkFirst, M/A-COM, Inc., http://www.networkfirst.com/features/solution, 2 pages, Mar. 2002.

It's Our Network That Makes the Difference, Information Sheet, OpenSky Network, M/A-COM, Inc., http://www.opensky.com/network/index.asp, 2 pages, Jun. 2005.

Network Management, Information Sheet, OpenSky Network, M/A-COM, Inc., http://www.opensky.com/network/netmgmtsys.asp, 2 pages, Sep. 2003.

ACU1000™ Interoperability NOW™, Information Sheet, Raytheon JPS Communications, http://www.jps.com/downloads/PDFS/acuupgrade.pdf, 4 pages, Feb. 2003.

Interoperability Gateway, OpenSky, NetworkFirst, P25$^{IP}$, Data Sheet, M/A-COM, Inc. ECR-7054, http://www.opensky.com/network/7054.pdf, 2 pages, Jul. 2004.

C3 Maestro$^{IP}$ Dispatch Console, OpenSky, NetworkFirst, P25$^{IP}$, Data Sheet, M/A-COM, Inc. ECR-7160A, http://www.opensky.com/network/7160.pdf, 2 pages, Jul. 2003.

V$^{IP}$ Dispatch Console, OpenSky, NetworkFirst, P25$^{IP}$, Data Sheet, M/A-COM, Inc. ECR-7241B, http://www.opensky.com/network/7241B.pdf, 2 pages, May 2005.

J. Polk, et al., Dynamic Host Configuration Protocol Option for Coordinate-based Location Configuration Information, Network Working Group, Internet RFC 3825, Category: Standards Track, The Internet Society, 15 pages, Jul. 2004.

OnStar Technology, Information Sheet, OnStar Corp., http://www.onstar.com/us_english/jsp/explore/onstar_basics/technology.jsp, 3 pages, Feb. 2005.

Cisco IP Interoperability and Collaboration System, Q&A, Copyright © Cisco Systems, Inc. www.cisco.com, 4 pages, Aug. 2003.

Cisco IPICS, Solution Overview, Copyright © Cisco Systems, Inc., www.cisco.com/go/ipics, 6 pages, Nov. 2004.

Matthews, et al., *A New Interoperability Paradigm a Concept Proposal*, Mar. 2006, *Worcester Polytechnic Institute, WPI Bioengineering Institute*, 15 pages.

U.S. Appl. No. 11/149,041 entitled, "*Method and System for Communicating Using Position Information*," inventors Shmuel (nmi) Shaffer et al., Jun. 8, 2005.

U.S. Appl. No. 11/201,832, entitled, "*Method and System for Automatic Configuration of Virtual Talk Groups Based on Location of Media Source*," inventors Shmuel (nmi) Shaffer et al., Aug. 10, 2005.

U.S. Appl. No. 11/202,400, entitled, "*Method and System for Communicating Media Based on Location of Media Source*," inventors Shmuel (nmi) Shaffer et al., Aug. 10, 2005.

U.S. Appl. No. 11/202,403, entitled, "*Method and System for Providing Interoperable Communications With Location Information*," inventors Shmuel (nmi) Shaffer, et al., Aug. 10, 2005.

U.S. Appl. No. 11/214,582, entitled, "*Method and System for Conveying Media Source Location Information*," inventors Shmuel (nmi) Shaffer et al., Aug. 29, 2005.

U.S. Appl. No. 11/364,146, entitled, "*Method and System for Providing Interoperable Communications with Congestion Management*," inventors Shmuel (nmi) Shaffer et al., Feb. 27, 2006.

Shaffer, et al., U.S. Appl. No. 11/399,031, filed Apr. 5, 2006, *Method and System for Managing Virtual Talk Groups*.

Shaffer, et al., U.S. Appl. No. 11/382,496, filed May 10, 2006, *Providing Multiple Virtual Talk Group Communications Sessions*.

Kalley, et al., U.S. Appl. No. 11/383,998, filed May 18, 2006, *Providing Virtual Talk Group Communications Sessions in Accordance with Endpoint Resources*.

Shaffer, et al., U.S. Appl. No. 11/421,994, filed Jun. 2, 2006, *Method and System for Joining a Virtual Talk Group*.

Shaffer, et al., U.S. Appl. No. 11/421,999, filed Jun. 2, 2006, *Method and System for Managing a Plurality of Virtual Talk Groups*.

Shaffer, et al., U.S. Appl. No. 11/617,019, filed Dec. 28, 2006, *Method and System for Providing Congestion Management within a Virtual Talk Group*.

Shaffer, et al., U.S. Appl. No. 11/746,960, filed May 10, 2007, *Method and System for Handling Dynamic Incidents*.

Shaffer, et al., U.S. Appl. No. 11/550,234, filed Oct. 17, 2006, *Method and System for Providing an Indication of a Communications*.

PCT Notification of Transmittal of the International Search Report and the Written Opinion of the International Searching Authority, or the Declaration, mailed Feb. 27, 2007, corresponding to PCT/US06/30447 filed Aug. 3, 2006 (20 pages).

PCT Notification of Transmittal of the International Search Report and the Written Opinion of the International Searching Authority, or the Declaration, mailed Apr. 9, 2007, corresponding to PCT/US06/30294 filed Aug. 2, 2006 (20 pages).

PCT International Search Report and Written Opinion (ISA/US) for PCT/US06/19227; 7 pages, Sep. 4, 2007.

Rivero-Angeles, Mario et al., *Random-Access Control Mechanism Using Adaptive Traffic Load in ALOHA and CSMA Strategies for EDGE*, May 2005, IEEE Transactions on Vehicular Technology, Vo. 54, No. 3, 2 (1161) May 2005.

Shaffer et al., U.S. Appl. No. 11/149,041, filed Jun. 11, 2005, Communication from the U.S. Patent and Trademark Office mailed Sep. 14, 2006.

Shaffer et al., U.S. Appl. No. 11/149,041, filed Jun. 11, 2005, Communication from the U.S. Patent and Trademark Office mailed Mar. 12, 2007.

Shaffer et al., U.S. Appl. No. 11/149,041, filed Jun. 11, 2005, Communication from the U.S. Patent and Trademark Office mailed Jan. 24, 2008.

Shaffer et al., U.S. Appl. No. 11/149,041, filed Jun. 11, 20051, Communication from the U.S. Patent and Trademark Office mailed Jul. 30, 2008.

Shaffer et al., U.S. Appl. No. 11/149,041, filed Jun. 11, 2005, Communication from the U.S. Patent and Trademark Office mailed Jan. 8, 2009.

Shaffer et al., U.S. Appl. No. 11/201,832, filed Feb. 28, 2006, Communication from the U.S. Patent and Trademark Office mailed Sep. 28, 2007.

Shaffer et al., U.S. Appl. No. 11/201,832, filed Feb. 28, 2006, Communication from the U.S. Patent and Trademark Office mailed Apr. 1, 2008.

Shaffer et al., U.S. Appl. No. 11/202,400, filed Aug. 10, 2005, Communication from the U.S. Patent and Trademark Office mailed Jul. 31, 2007.

Shaffer et al., U.S. Appl. No. 11/202,400, filed Aug. 10, 2005, Communication from the U.S. Patent and Trademark Office mailed Apr. 25, 2008.

Shaffer et al., U.S. Appl. No. 11/202,400, filed Aug. 10, 2005, Communication from the U.S. Patent and Trademark Office mailed Mar. 9, 2009.

Shaffer et al., U.S. Appl. No. 11/202,403, filed Feb. 28, 2006, Communication from the U.S. Patent and Trademark Office mailed Sep. 28, 2007.

Shaffer et al., U.S. Appl. No. 11/202,403, filed Feb. 28, 2006, Communication from the U.S. Patent and Trademark Office mailed Apr. 1, 2008.

Shaffer et al., U.S. Appl. No. 11/214,582, filed Aug. 29, 2005, Communication from the U.S. Patent and Trademark Office mailed Oct. 22, 2007.

Shaffer et al., U.S. Appl. No. 11/214,582, filed Aug. 29, 2005, Communication from the U.S. Patent and Trademark Office mailed Mar. 28, 2008.

Shaffer et al., U.S. Appl. No. 11/214,582, filed Aug. 29, 2005, Communication from the U.S. Patent and Trademark Office mailed Sep. 16, 2008.

Shaffer et al., U.S. Appl. No. 11/214,582, filed Aug. 29, 2005, Communication from the U.S. Patent and Trademark Office mailed Mar. 16, 2009.

Shaffer et al., U.S. Appl. No. 11/214,582, filed Aug. 29, 2005, Communication from the U.S. Patent and Trademark Office mailed Sep. 1, 2009.

Communication from the U.S. Patent and Trademark Office re Shaffer et al., U.S. Appl. No. 11/149,041 mailed Jun. 17, 2009.

Shaffer et al., U.S. Appl. No. 11/214,582, Final Office Action from the United States Patent and Trademark Office mailed Apr. 27, 2010.

Text of the First Office Action from IP Office of People's. Republic of China for Application No. 200680014772.3 (3 pages), May 27, 2010.

Second Office Action from the Patent Office of the People's Republic of China; for Application No. 200680014772.4, Nov. 25, 2010.

Shaffer et al., U.S. Appl. No. 11/149,041, Office Action from the United States Patent and Trademark Office mailed Mar. 3, 2011.

The Third Office Action from the Patent Office of the People's Republic of China; for Application No. 200680014772.4, Mar. 23, 2011.

Rejection Decision from the Patent Office of the People's Republic of China; for Application No. 200680014772.4, Oct. 26, 2011.

\* cited by examiner

METHOD AND SYSTEM FOR PROVIDING INTEROPERABLE COMMUNICATIONS WITH DYNAMIC EVENT AREA ALLOCATION

TECHNICAL FIELD OF THE INVENTION

This invention relates in general to communication systems and, more particularly, to a method and system for providing interoperable communications with dynamic event area allocation.

BACKGROUND OF THE INVENTION

Many public and private groups, such as security and safety personnel (e.g., police, firefighters and ambulance drivers) use various communication networks of differing technologies and types for communication. Many networks utilize land mobile radios communicating through push-to-talk technologies. However, communications among different endpoints of different networks such as endpoints of different police, fire or other security networks may be difficult. Collaboration between the different agencies and networks tends to be ad hoc and inefficient. When achieved, it often involves laborious manual intervention. Organizations working towards interoperability solutions include Raytheon JPS Communications, IP Blue, Twisted Pair, M/A-COM and Cisco Systems.

SUMMARY OF THE INVENTION

The present invention provides a method and system for providing interoperable communications with dynamic event area allocation that substantially eliminates or reduces at least some of the disadvantages and problems associated with previous methods and systems.

In accordance with a particular embodiment, a method for providing interoperable communications with dynamic event area allocation includes facilitating communications of a plurality of virtual talk groups. Each virtual talk group includes a plurality of endpoints of different communication networks communicating using a respective communication protocol. The method includes receiving notice of an event comprising an event location and creating an event area based on the event location. The method also includes associating an event virtual talk group with the event for communications regarding the event. The method also includes modifying the event area based on at least one location parameter associated with the event.

Where the method includes modifying the event area based on at least one location parameter associated with the event the method may include uniformly expanding the event area outward, the location parameter comprising an estimated speed with which a subject of the event is moving. The method may include expanding the event area outward in a non-uniform manner, the outward expansion comprising a rate of expansion in at least one direction based on an estimated speed with which a subject of the event is moving. The estimated speed with which the subject of the event is moving may be based on a speed associated with at least one roadway within the event area.

The method may also include creating an update channel for providing endpoints within the event virtual talk group with information relating to the event and a subject of the event. The method may also include receiving a notice updating a location of a subject of the event and modifying the event area based on the updated location of the subject of the event.

The method may also include notifying endpoints within the event area that they are within the event area. The method may also include adding endpoints within the modified event area to the event virtual talk group or removing endpoints from the event virtual talk group not within the modified event area. It also may include adding endpoints of a first virtual talk group to an event virtual talk group. It also may include adding capacity to the event virtual talk group based on the modified event area.

In accordance with another embodiment, a system for interoperable communications with a dynamic event area includes an interface operable to facilitate communications of a plurality of virtual talk groups. Each virtual talk group comprises a plurality of endpoints of different communication networks communicating using a respective communication protocol. The interface is further operable to receive notice of an event comprising an event location. The system also includes a processor coupled to the interface. The processor is operable to create an event area based on the event location. The processor is also operable to associate an event virtual talk group with the event for communications regarding the event. The processor is also operable to modify the event area based on at least one location parameter associated with the event.

Technical advantages of particular embodiments include systems and methods for providing interoperable communications among endpoints of various types that utilize differing technologies. Virtual talk groups may be created dynamically to enable communication among a subset of endpoints for particular circumstances, such as those endpoints within a defined area representing the possible locations of a subject of an event. Particular embodiments allow for the area to expand to account for the movement of the subject of the event. Accordingly, as time passes and the subject of the event moves, the event area increases thereby keeping the moving subject within the event area. This in turn ensures that the event area includes those endpoints within proximity of the subject of the event. Particular embodiments relocate the event area when a report of the location of the subject of the event is received. Accordingly, the size of the virtual talk group can be controlled by allowing the size of the event area to be reduced as it is relocated. Thus the endpoints that are no longer within proximity of the new location of the subject of the event may be removed from the event virtual talk group.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION

Figure 1:
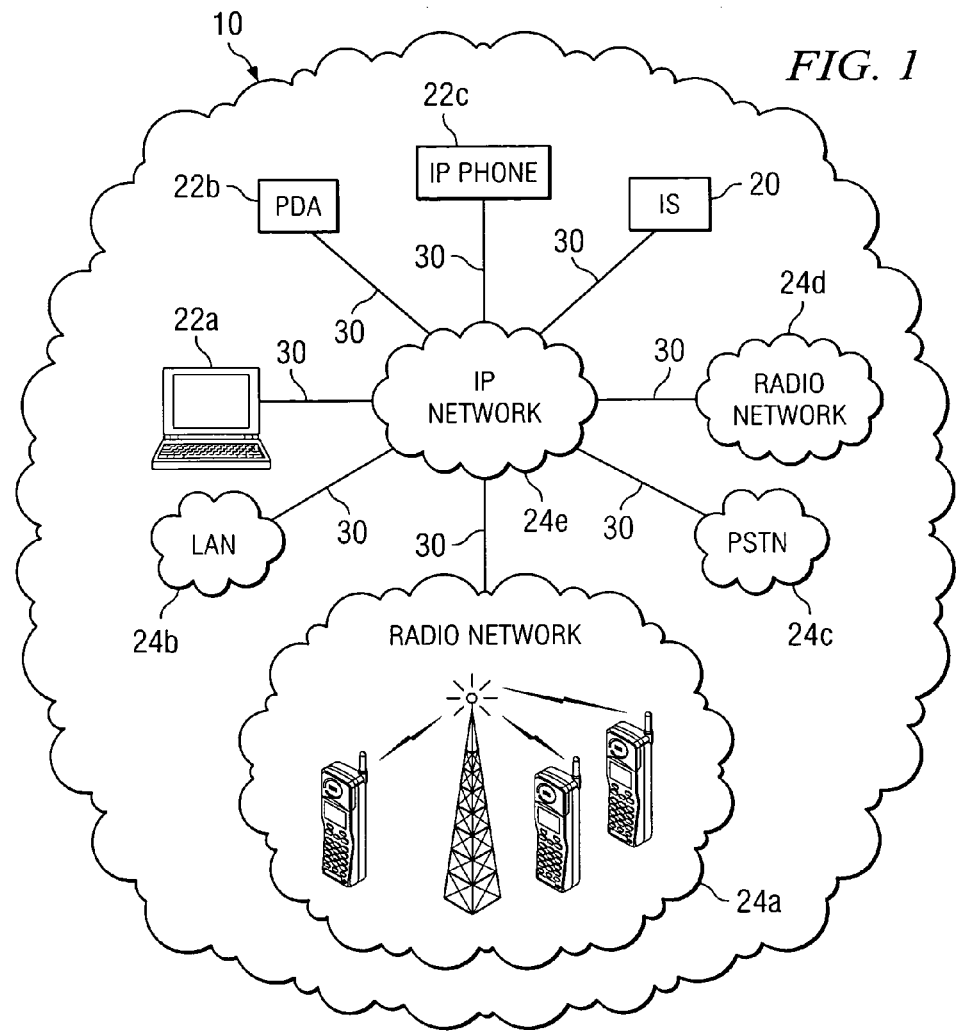
FIG. 1 illustrates a communication system with various communication networks and an interoperability system, in accordance with a particular embodiment.

FIG. 1 illustrates a communication system 10, in accordance with a particular embodiment. Communication system 10 includes communication networks 24a-24e, interoperability system (IS) 20 and endpoints 22a-22c. IS 20 is able to facilitate interoperable communication sessions between and among various communication devices, such as endpoints of communication networks 24 and endpoints 22. IS 20 uses a systems approach to offer a framework based on IP protocols and services to immediately achieve secure voice, video and other data interoperability among communication endpoints and networks utilizing different technologies.

In particular embodiments a dynamic event area may be used in grouping together various endpoints of different communication networks. More specifically, when an event occurs that needs endpoints of potentially different communication networks the dynamic event area may be used to allow those endpoints within a predetermined distance of a subject of the event to be able to communicate with one another. The event area may be such that it includes all possible locations of the event subject based on certain presumptions as to the rate of travel of the event subject. These presumptions as to the rate of travel of the event subject may cause the size, shape and/or location of the event area to change over time. The event area may be used as the basis for a virtual talk group that includes endpoints within the event area.

In some embodiments the constantly expanding event area can be relocated and resized. When the event area is relocated, it may be reduced in size because such a large event area may not be needed to ensure that desired endpoints are able to communicate with each other. Once the event area has been relocated and resized it may resume expanding as it was before.

In the illustrated embodiment, communication networks 24a and 24d comprise radio networks (RNs), communication network 24b comprises a local area network (LAN), communication network 24c comprises a public switched telephone network (PSTN) and communication network 24e comprises an IP network. It should be understood, however, that communication system 10 may comprise any number of IP or non-IP communication networks of any wireless or wireline form capable of communicating audio and/or video telecommunication signals, data, and/or messages, including signals, data or messages. Communication networks 24a-24e may include any number and combination of segments, nodes and endpoints to enable communication among network devices and components. Communication networks 24a-24e may be distributed locally or across multiple cities and geographic regions. Nodes may include any combination of network components, gatekeepers, call managers, conference bridges, routers, hubs, switches, gateways, base stations, endpoints or other hardware, software or embedded logic implementing any number of communication protocols that allow for the exchange of data in communication system 10. Segments 30, which may comprise any suitable wireless or wireline communication links, including one or more communication networks (e.g., WANs) as appropriate, couple various networks with each other and with endpoints 22 and IS 20. In particular embodiments, segments may include gateways for facilitating communication between various networks, such as a land mobile radio (LMR) gateway between radio network 24a and IP network 24e.

In some cases, users of endpoints of one of communication networks 24a-24e may communicate with endpoints of another of communication networks 24a-24e through IS 20. A radio network, such as radio network 24a or 24d, may support communication among portable mobile station endpoints, such as land mobile radios (LMRs), using any suitable communication methods or features, such as cellular and push-to-talk (PTT). Communication networks 24a-24e may comprise networks of particular groups or agencies (e.g., a municipality's police department network), whether operational with respect to a particular area or otherwise.

IS 20 enables, facilitates and/or provides for interoperable communication among communication endpoints and devices, such as LMRs, cellular phones, IP phones, PCs, PDAs, PSTN phones, video monitors, cameras and sensors of one or more communication networks (e.g., communication networks 24a-24e) using Internet Protocol. Such endpoints may comprise IP or non-IP-enabled endpoints. In particular embodiments, IS 20 may control gateways (for example, of segments 30) in order to map radio frequencies of particular mobile radio endpoints to IP addresses for communication to other types of radio endpoints or IP devices. For example, a particular gateway may be able to receive communications from various types of endpoints (e.g., on various types of communication networks) and may convert such communications for transmission to other types of endpoints. IS 20's control of the gateway may control the various endpoints and/or networks that receive particular communications, depending on system functionality and configuration as further discussed below. As indicated, such control may include the mapping of communications and endpoints to IP addresses for interoperable communication. In some embodiments, IS 20 may host audio conferences that bridge communications received from endpoints. As indicated above, communication system 10 (including IS 20) may include any suitable number or type of gateways (e.g., LMR and PSTN gateways), servers (e.g., multipoint conference servers), switches, routers, firewalls, access points, processors, memory or other hardware, software or encoded logic to provide functionality described herein. IS 20 is coupled to communication networks 24a-24d and endpoints 22 through IP network 24e, which may comprise any suitable IP network.

As indicated above, IS 20 uses IP to enable communication among endpoints of various networks. The manner in which IS 20 facilitates communications among endpoints may vary according to location and system or operational needs. For example, IS 20 may communicate with endpoints using multicast IP addresses assigned to an endpoint of a communication network, a group of endpoints of a communication network or one or more endpoints of multiple communication networks or alternatively using a peer to peer dialed connection or a nailed dialed connection. A group of endpoints may be combined into a virtual talk group for communication using a particular IP address. As an example, the virtual talk group may be assigned a multicast IP address through which users of various endpoints may communicate on the talk group. The use of multicast IP addresses allows IS 20 to facilitate communications among communication devices and endpoints of various communication networks to provide audio, data, video and control network interoperability. As an additional example, in some cases multicast streams (e.g., utilizing multicast IP addresses) may be used. In some cases nailed dialed connections, such as those using SIP protocol, may be used for communication among endpoints and with IS 20. Various embodiments may combine communication methods to facilitate communication among endpoints. For example, in some cases certain endpoints of a virtual talk group may participate in the talk group through a multicast IP address while other endpoints may utilize a nailed SIP connection. IS 20 may control this participation, such as by controlling gateways, multipoint conferences and the mapping of communications to IP addresses.

IS 20 may be utilized and implemented in any number of market segments, such as enterprise safety and security (e.g., loss prevention), transportation, retail, public safety and federal agencies in order to provide radio and non-radio network interoperability within and between such market segments. As indicated above, such network interoperability includes the interoperability of push-to-talk voice technology within various networks and the interoperability between push-to-talk and full duplex dialed connections.

It will be recognized by those of ordinary skill in the art that endpoints 22 and IS 20 may be any combination of hardware, software, and/or encoded logic that provides communication services to a user. In the illustrated embodiment, endpoints 22 comprise a PC (endpoint 22a), a PDA (endpoint 22b) and an IP phone 22c). However, in other embodiments, endpoints 22 may include a telephone, a personal computer (PC), a video monitor, a camera, an IP phone, a cell phone, a land mobile radio (LMR), a personal digital assistant (PDA), a command center, or any other communication hardware, software and/or encoded logic that supports the communication of audio, video or other data, using packets of media (or frames) or otherwise, through communication system 10. Endpoints 22 as well as endpoints and components of communication networks 24 may be capable of communicating using any particular type of technology, such as cellular, IP, PSTN, CDMA, GSM, TDMA and satellite. Endpoints 22 and IS 20 may also include unattended or automated systems, gateways, other intermediate components or other devices that can establish media sessions.

Although the illustrated embodiment includes five communication networks 24a-24e, the term "communication network" should be interpreted as generally defining any network capable of transmitting audio and/or video telecommunication signals, data, and/or messages, including signals, data or messages. Any one of networks 24a-24e may be implemented as a local area network (LAN), wide area network (WAN), cellular network, global distributed network such as the Internet, Intranet, Extranet, PSTN, LMR network, CDMA network, GSM network, TDMA network, satellite network or any other form of wireless or wireline communication network.

Communications over communication networks 24a-24e may use any suitable communication protocol. In a particular embodiment, some communication networks may employ voice communication protocols that allow for the addressing or identification of endpoints, nodes, and/or other components coupled to the communication network. For example, using Internet protocol (IP), each of the components coupled together by, for example, communication network 24b in communication system 10 may be identified in information directed using IP addresses. In this manner, network 24b may support any form and/or combination of point-to-point, multicast, unicast, or other techniques for exchanging media packets among components in communication system 10. Any network components capable of exchanging audio, video, or other data are included within the scope of the present invention.

Since IP networks share a common method of transmitting data, telecommunication signals may be transmitted between telephony devices located on different, but interconnected, IP networks. In addition to being coupled to other IP networks, communication network 24b may also be coupled to non-IP telecommunication networks, for example through the use of interfaces or components, including gateways. In the illustrated embodiment, communication network 24b may be coupled with PSTN 24c through a gateway. In some embodiments the gateway may be a part of IS 20 or network 24e. PSTN 24c includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 24c), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, one or more of endpoints 22, and endpoints and components of communication networks 24 may be IP telephony devices capable of participating in IM, video, and other multimedia communication sessions. IP telephony devices have the ability of encapsulating a user's voice (or other input) into IP packets so that the voice can be transmitted over a communication network. IP telephony devices may include telephones, fax machines, computers running telephony software, nodes, gateways, wired or wireless devices, hand held PDAs, or any other device capable of performing telephony functions over an IP network.

In particular embodiments, communication system 10 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

Although FIG. 1 illustrates a particular number and configuration of endpoints, IS and communication networks, communication system 10 contemplates any number or arrangement of such components for communicating media.

Figure 2:
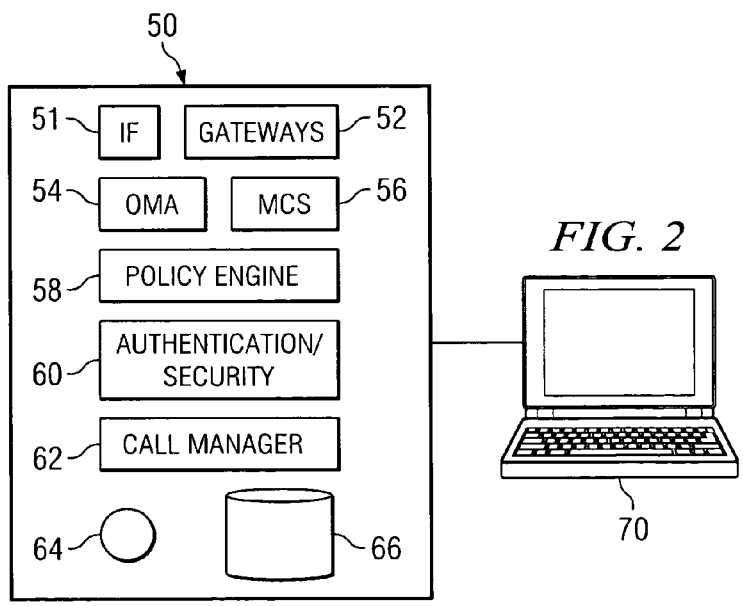
FIG. 2 illustrates an example interoperability system, in accordance with a particular embodiment.

FIG. 2 illustrates interoperability system (IS) 50, in accordance with a particular embodiment. IS 50 may be similar to and provide the same functionality as IS 20 of FIG. 1. In the illustrated embodiment, IS 50 includes interface 51, gateways 52, operations management application (OMA) 54, multipoint conference system (MCS) 56, policy engine 58, authentication and security system 60, call manager 62, processor 64 and memory module 66. IS 50 is coupled to a PC endpoint 70 that may be used to access, configure and control various functionality provided by IS 50. PC endpoint 70 may run a client application for such access, configuration and control. The client application may enable a user of endpoint 70 to receive and monitor communications from various endpoints and virtual talk groups. In particular embodiments, other types of endpoints may be utilized to access, configure and control IS 50, such as IP phones, PDAs and mobile devices. IS 50 may be coupled to such endpoints (including PC endpoint 70) through one or more communication networks.

Interface 51 is used in the communication of audio, video, signaling and other data between IS 50 and other network components. For example, interface 51 may receive communications from endpoints such as endpoints of communication networks 24, endpoints 22 and endpoint 70. The communication may take place over IP networks thereby negating the need for dedicated wiring between the endpoints and the IS.

Gateways 52 may include any suitable gateways to provide network interoperability and back-end legacy application integration, such as LMR gateways, PSTN gateways and application gateways. Gateways 52 provide mapping between IP services and the interoperable networks, such as LMR network 24a of FIG. 1. In some cases gateways 52 may not be located within an IS but may be distributed throughout a communication system for enabling communications among various communication networks.

Operations management application (OMA) 54 includes functionality for configuration, management and control of IS 50, including conference and collaboration management, and may be accessed by a user via, for example, PC endpoint 70. In particular embodiments, OMA 54 may enable a user, such as dispatch personnel or administrators or a mobile user (e.g., a first responder mobile user) accessing IS 50 via a mobile endpoint, the ability to configure, manage and participate in one or more virtual talk groups and ad hoc conferences simultaneously. In particular embodiments, OMA 54 may be accessed through a web interface, functioning for example as a soft phone for radios. A screen display may be controlled using a mouse, keypad, touch screen, voice commands or any other suitable interface. OMA 54 screens may include any number of functional controls to provide interoperable communications. OMA 54 may authenticate a user and obtain user configuration information upon a user accessing the OMA. OMA 54 may monitor and provide communication ability for any number of channels at one time to provide the ability for an OMA user to communicate on and control multiple virtual talk groups at once.

Multipoint conference system (MCS) 56 provides collaboration and conference services for multiple endpoints of one or more networks. For example, users of multiple endpoints (such as LMRs of different networks (e.g., networks of different agencies or groups) and different types of endpoints of different networks) may be bridged together through MCS 56 to provide virtual talk group communications. MCS 56 may include any suitable number or type of conference bridges, ports, digital signal processors or other components to facilitate communications discussed herein.

Policy engine 58 includes policies for undertaking various operations and functionality upon the occurrence of various events to provide dynamic incident management. These policies may include both pre-determined and ad hoc policies. For example, upon the occurrence of a particular event, the event may include a unique identifier and may have basic event attributes such as time of creation, name of user creating, location of event and status. A pre-determined policy may then be executed by an incident manager or dispatch personnel as action for the specific event. In particular embodiments, policy engine 58 may receive inputs from alarms and sensors to set up device diagnostic communications interoperability and one-way video and data collaboration and to trigger additional events such as pagers, e-mails, notifications, dial-outs, recording and information escalation. Additionally, policy engine 58 may be used to determine how the event area may be modified, including how it will expand and where and when the event area may be relocated. For example, policy engine 58 may use a uniformly expanding event area where the event subject is located in an area with only a few roads or it may use a non-uniformly expanding event area where there are several roads that the event subject may use.

Authentication and security system 60 manages access, configuration and control privileges for users of IS 50 and those participating in interoperable communications. For example, different users may have different privileges assigned for interoperable communications. Some users may only have transmit or listen privileges with respect to one or more particular talk groups, while other users may have the ability to communicate in all talk groups or setup and configure various talk groups. User privileges may change dynamically upon the occurrence of particular events or changes in the event area, such as where the event area is relocated and an endpoint is no longer within the event area.

Call manager 62 maintains information regarding various users, such as users of IP networks for which interoperable communications are provided by IS 50. This facilitates in the extension of PTT to IP networks and in the provision of voice and data interoperability across radio and non-radio networks. In particular embodiments, call manager 62 may maintain a listing, table, or other organization of information about users. The information may include a name or other identifier and contact information such as phone numbers and email addresses for the users. In particular embodiments call manager 62 may represent any appropriate combination of hardware, software and/or encoded logic distributed throughout a communication network coupled with an IS.

Processor 64 may be a microprocessor, controller, or any other suitable computing device, resource, or combination of hardware, software and/or encoded logic operable to provide, either alone or in conjunction with other IS components such as OMA 54, IS 50 functionality. Such functionality may include providing various features discussed herein to a user, such as a user of an endpoint accessing IS 50 through OMA 54. Such features may include determining the size, shape, expansion and/or relocation of an event area, determining whether an endpoint should be added to an event VTG, providing to the user of an endpoint location information of communicating endpoints of a plurality of monitored endpoints and/or virtual talk groups, enabling the user to listen to and/or participate in communications involving endpoints and/or virtual talk groups associated with a particular event, presenting communications of endpoints of event virtual talk groups according to preconfigured or received instructions and controlling various gateways and other network components to facilitate interoperable communications among various endpoints.

Memory module 66 may be any form of volatile or non-volatile memory including, without limitation, magnetic media, optical media, random access memory (RAM), read-only memory (ROM), removable media, or any other suitable local or remote memory component. Memory module 66 may store any suitable data or information, including software and encoded logic, utilized by IS 50. In particular embodiments, memory module 66 may include data for user management, talk-group management, resource pool management, privileges, backup configuration and information and/or timestamp and activity tracking.

IS 50 may also include any number of switches, routers, firewalls, mobile access routers, access points, wireless bridges and other components in order to accommodate particular operational desires and needs.

In particular embodiments such as in the LMR network interoperability context, IS 50 may, through one or more components discussed above or through other components, encode received audio with a standard audio codec, such as G.711 or G.729. Those audio samples may be packaged in standards-based real-time transport protocol (RTP) packets suitable for transport on an IP network. At this point, the communication element may be abstracted from the distinctive characteristics of each radio system. These audio packets can be sent across the network to other radio systems either individually (unicast) or as a group (multicast). The recipient of the audio packets may be a device capable of receiving and decoding the RTP stream, such as an IP telephone or PC with appropriate software. The IP network and IP-enabled devices can be used to allow users to monitor or transmit on a particular radio channel from a desk without issuing another radio.

As indicated above, IS 50 may facilitate communication among users of endpoints of various networks through virtual channels or talk groups. For example, a channel may comprise a unidirectional or bidirectional path for transmitting and/or receiving electrical or electromagnetic signals. This may comprise, for example, a conventional radio physical RF channel. A talk group in this context may be a subgroup of users (e.g., radio users) who share a common functional responsibility and typically coordinate actions amongst themselves without radio interaction with other subgroups. For example, a municipality's police department network may include various talk groups.

A virtual talk group (VTG) represents interoperability of a group of channels, for example, as an audio conference or meeting. A virtual talk group may include an associated virtual channel and an ID. Virtual channels may comprise an address, such as an IP address, associated with a virtual talk group through which users may access the virtual talk group and/or through which communications from VTG member-endpoints are bridged. Various types of virtual talk groups may be utilized in particular embodiments, such as a multicast address usable by all endpoints of the VTG, a VTG comprising multiple talk groups (e.g., multiple radio sources from different frequencies whose communications are mixed), a unicast group and a combination unicast and multicast group.

As an example, a particular virtual talk group may comprise a conference or meeting of the following: (1) a channel or other multicast path used by certain users of a police department's radio network, (2) a channel or other multicast path used by certain users of a fire department's radio network, (3) a channel or other multicast path used by certain users of a corporation's security radio network, (4) a plurality of users of IP-enabled endpoints such as IP phones, IP-enabled PDAs or PCs and (5) a plurality of users of plain old telephones (POTs) such as cell phones or time-division multiplexed (TDM) phones. An operator of IS 50 may configure the virtual talk group using any suitable interface, such as by dragging and dropping the included channels and IP endpoints into a single area representing the virtual talk group. The IS may itself configure the VTG, such as by including endpoints within an event area in an event VTG associated with the event area. Regardless of how the VTG is initially configured, during the life of the VTG the various users comprising the VTG may change as the size of the event area changes and/or as the event area is relocated.

MCS 56 may provide the functionality for the conference of the virtual talk group members. In particular embodiments, multiple talk groups may be patched together on a dynamic, as needed basis. In some cases a virtual talk group may not necessarily include communications through an IS but may instead include member endpoints whose communications are mapped to IP addresses at gateways (such as LMR gateways) controlled by an IS.

Any number of virtual talk groups may be configured to provide any suitable audio, data, video and control network interoperability. Virtual talk groups may be created using any suitable user/endpoint groups or channels based on location, organizational requirements, event requirements or any other suitable characteristic. An administrator or operator may configure channel details such as name, description, participants, multicast IP addresses, codec and latch options through, for example, OMA 54.

Figure 3:
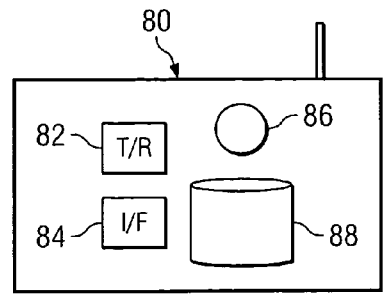
FIG. 3 illustrates an example endpoint, in accordance with a particular embodiment.

FIG. 3 illustrates an endpoint 80, which may comprise a mobile endpoint, in accordance with a particular embodiment. Endpoint 80 may be similar to, and may provide functionality similar to, other endpoints discussed herein.

In the illustrated embodiment, endpoint 80 includes a transmitter/receiver 82, a user interface 84, a processor 86 and a memory module 88. Transmitter/receiver 82 receives and transmits communications such as audio, video and other data to and from other network components and may also obtain signals from GPS satellites or ground stations of a communication network in order to determine a position of endpoint 80. User interface 84 provides a mechanism through which a user of endpoint 80 may operate the endpoint and communicate with other network devices. Interface 84 may comprise a keypad, display, touch screen, audio input or any other suitable interface. Instructions may be submitted through speech recognition, collection of keystrokes, soft key or otherwise.

Processor 86 may be a microprocessor, controller, or any other suitable computing device, resource, or combination of hardware, software and/or encoded logic operable to perform endpoint functionality. Processor 86, either alone or in conjunction with other endpoint components, provides endpoint functionality discussed herein. Memory module 88 may be any form of volatile or non-volatile memory including, without limitation, magnetic media, optical media, random access memory (RAM), read-only memory (ROM), removable media, or any other suitable local or remote memory component.

In particular embodiments, communications from endpoints such as endpoint 80 may include GPS information indicating the location of the endpoint from which a particular communication is transmitted. The GPS information may be carried by both unicast and multicast communications. With this information, whenever a user utilizes an endpoint to communicate, the specific location from where the media (e.g., PTT or other communication) was transmitted may be identified, for example at PC endpoint 70 through IS 50. In some cases, a gateway may be used to bridge between media streams that include location information of a transmitting endpoint and media streams that do not include location information of a transmitting endpoint. For example, some legacy mobile devices may not be able to embed or otherwise include GPS information within a media stream. In the instances in which a mobile device is unable to provide GPS information, its location may still be used by IS 50 where its location is ascertained through other means. For example, the location of the mobile device may be estimated based on the strength of its signal at different communication towers, or the user of the device may relay his location orally.

Particular embodiments provide automated configuration of endpoints into event VTGs based on their locations. In one embodiment, a user through a client application may establish connection with an IS, such as IS 50, and may continuously update the IS regarding the user's location. Using the location information the IS may configure endpoints as participants in an event VTG having an associated event area that includes the user therein. The event area may be a dynamically changing area designed to ensure that it encompasses all possible locations of the event subject by expanding, based on assumptions as to the rate of travel, and relocating, based on updated location information. The event area may be used to automatically add endpoint to an event VTG comprising other endpoints located within the event area. In addition, as time passes participant endpoints in the VTG may dynamically change (e.g., may be added and removed from the VTG). For example, endpoints may move into or out of the event area or the event area may relocate to a new area that does or does not include the endpoint.

In some cases, the IS may apply a form of hysteresis. As a result, once a user joins the event VTG he may remain a member through the end of the event. In some cases, once an endpoint is added to the event VTG, based on the endpoint's location within the event area, the endpoint may remain a member of the event VTG despite leaving the event area as long as the endpoint is within another, larger area that includes the event area. Hysteresis may also be applied to delay or prevent the addition of endpoints to an event VTG. For example, an endpoint may not be added to an event VTG until the endpoint is within another, smaller area within the event area. Hysteresis may also be used to delay the adding or removing of the endpoint to the event VTG for a certain amount of time. For example, the endpoint may need to be within, or outside of, the event area for a certain amount of time before the endpoint can be added or removed. Hysteresis may be applied to any of the functionality discussed herein.

In some embodiments, a user may elect to opt out of the event VTG if he travels out of the area defined by the system as the event location area. Particular embodiments may automatically conference users who are joining the event VTG via unicast with, e.g., SIP signaling. Some embodiments may also automatically and dynamically add/drop users into/from a conference bridge using hysteresis as a key part of an add/drop user algorithm. In one embodiment, users of endpoints may be requested to approve the automatic action of adding/dropping them into/out of the event VTG. In some embodiments, a user traveling through different areas may be coming in and out of multicast range. An IS in some embodiments may automatically switch the user between multicast connectivity and a nailed SIP connection to accommodate capabilities of a locally available network. In addition, in some cases if a user is continuously moving in and out of a multicast area, the IS may fix their connectivity to a VTG via a nailed dialed connection.

Figure 4:
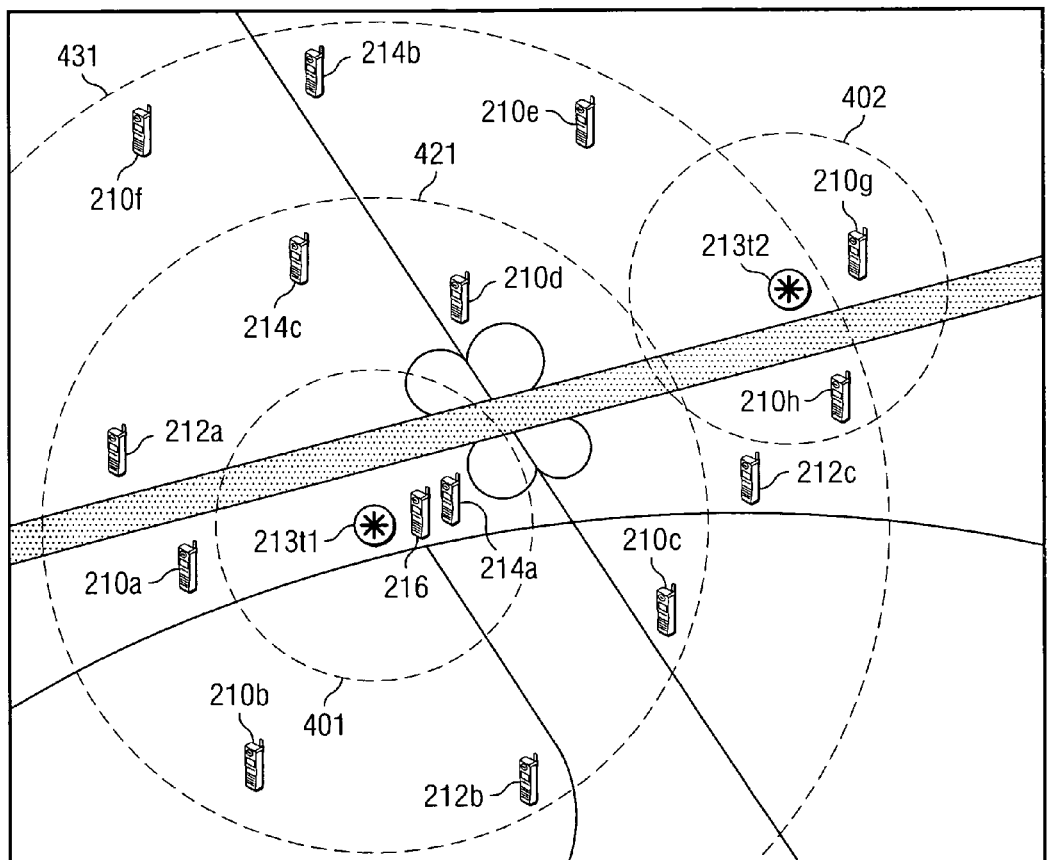
FIG. 4 illustrates an example display wherein an event area expanded uniformly, in accordance with a particular embodiment.

FIG. 4 is an example display 400 of an endpoint, such as PC endpoint 70 or another mobile or non-mobile endpoint, accessing an IS through an OMA, in accordance with a particular embodiment. It should be understood that displays of endpoints accessing an IS in other embodiments may include additional or different information related to the functionality and/or communications of the IS.

In this embodiment, display 400 is presenting a particular geographical area having multiple endpoints (endpoints 210a-210h, 212a-212c, 214a-214c, and 216), subject locations (subject location 213t1 and 213t2), and event borders (event borders 401, 421, 431 and 402) located therein. As used herein, the terms scene, event or incident can be used interchangeably to describe one another. For example, a scene may include an event or incident.

Display 400 depicts the same geographic area at several different moments in time, where subject location 213t1 is the event subject's original location and subject 213t2 is the subject's location at a later moment in time. Similarly event areas 401, 421, 431 and 402 represent the extent of the event area at different moments in time. Display 400 of an actual endpoint may simply show the current event border and subject location. For example, at a particular time display 400 may present a particular geographical area having multiple endpoints (endpoints 210a-210h, 212a-212c, 214a-214c, and 216), the subject's last known location (e.g. subject location 213t1), and the current event border (e.g. event border 421) located therein.

In the illustrated embodiment various endpoints may belong to one or more talk groups, VTGs, or event VTGs and may be communicating on different communication networks. In some cases, endpoints of different communication networks may include endpoints that are communicating on different channels or frequencies. To illustrate the situation in which an endpoint is in multiple talk groups or VTGs consider the situation where, for example, endpoints 212a, 212b and 212c are part of a paramedic VTG and where endpoint 212a is a land mobile radio using a particular municipality's paramedic network, endpoint 212b is a land mobile radio using a different municipality's paramedic network and endpoint 212c is a cellular phone of a paramedic from a private paramedic service. Thus, endpoint 212a, for example, may be part of the paramedic VTG as well as his municipality's paramedic talk group.

The IS may facilitate interoperable communications among endpoints such that communications transmitted by endpoints of one communication network may be communicated, through one or more base stations or other network components, to an endpoint of a different communication network. In addition, the IS may convert communications received from these endpoints to IP packets for transmission and receipt by particular IP endpoints. In some cases, the IS may control various gateways to facilitate the conversion of communications to IP packets. Thus endpoints 212a, 212b, and 212c may communicate with one another as though they are part of the same network even though they are using different communication methods, devices and/or channels. Accordingly, if paramedic 212c sends a message with his cell phone the IS causes the message to be communicated to the LMRs of paramedics 212a and 212b, the other endpoints of the event VTG. It should be noted that when an endpoint within a VTG uses a particular communication network the IS may not cause their messages to be rebroadcast among other endpoints using the same communication network because the message may already be propagated by that communication network. Similarly, if an endpoint is part of a communication network, but is not itself within the event VTG, that endpoint may be able to participate in the event VTG via their communication network.

The illustrated example shows locations of various endpoints 210, 212 and 214. In some cases, the locations of these endpoints may be updated when a user of the endpoint transmits an audio, video or other message through the endpoint since location information may be transmitted or determined at that time (e.g., embedded within the media stream or calculated using the signal strength at various communication relay points).

To see how an event area is created, expands and relocates, and how the event area affects the endpoints therein, assume that the event subject robs a bank and then flees the scene. In particular embodiments IS 50 may automatically mark the location of the robbery using subject location 213t1. IS 50 may automatically mark the location of the robbery where it is provided the location through an automated means, for example an address associated with the alarm signal, or a report from an endpoint that transmits its location. In some embodiments the location of the robbery may have to be marked manually, for example where a dispatcher receives a call from an unknown location or from a location other than the location of the event. It should be noted that the moving subject of an event may not always be a suspected criminal and may not always be a human. For example the event subject may be a runaway train, a lost child, a dangerous wild animal loose in a city, a fire or anything else that is moving.

From subject location 213t1 the IS may create an initial event area 401. Depending on the particular embodiment and configuration of IS 50 the size of event area 401 may always be the same, change from event to event, be predetermined based on the type of event or the location of the event or be based on any other factor or criteria that may be relevant in determining the initial size of an event area. Furthermore, the initial shape of the event area may always be the same, change from event to event, be predetermined based on the type of event or the location of the event or be based on any other factor or criteria that may be relevant in determining the initial shape of an event area. Here, for simplicity initial event area 401 is a circle centered around the event location 213t1.

Within event area 401 are endpoints 214a and 216, where endpoint 214a may be a firefighter and endpoint 216 may be a bank security guard. These two endpoints may use different networks for communication. Thus, if they are to be able to communicate with one another they may be placed in an event VTG. However, assume that firefighter 214a is already on his way to a fire and can not participate in the event VTG for the robbery. In some embodiments firefighter 214a may elect to not be added to an event VTG. If firefighter 214a is not to be part of the event VTG, for whatever reason, then the IS may not need to associate an event VTG with the event because there is only guard 216 within the event area. Similarly the IS may not associate an event VTG with an event if firefighter 214a and guard 216 were already on the same communication network. However, if firefighter 214a and guard 216 were already within the same VTG, then the IS may associate that VTG with the event, as opposed to creating a new event VTG to be associated with the event.

Furthermore, while endpoint 210a is not currently within event area 401, it may be desired, for any particular reason, to include him in the event VTG so that he can participate in the event VTG communications. Accordingly some embodiments may add endpoints that are within a predefined distance from the edge of the event area.

After the IS sets up initial event area 401 the event area may begin to expand. Depending on how the IS is configured the rate of expansion may be the same for all events, the same for all events within the same category (e.g. one rate for robberies, another rate for car jackings, etc.) or vary from event to event based on the location of the event, the situation and/or information supplied by a user of the IS, such as a dispatcher. Display 400 may be continuously updated so that the displayed event area is a real-time representation of the event area or it may be periodically updated so that the displayed event area matches the actual event area as of the last update of the display.

As the event area expands additional endpoints may come to be within the event area. Thus, at a particular point in time (after the initial event) the event area may have expanded to event area 421. Event area 421 includes endpoints 210a-210d, who may be police officers, endpoints 212a and 212b, who may be paramedics and endpoint 214c, who may be a firefighter, as well as firefighter 214a and guard 216 who were original members of the event VTG. Depending on the embodiment of the IS, once an endpoint is within an event area the IS may: (1) automatically include the endpoint in the event VTG, (2) determine whether to include the endpoint in the event VTG based on the service the endpoint provides (e.g. the IS may not add a bank security guard if the event is a wild fire), (3) determine whether to include the endpoint in the event VTG based on whether the endpoint is involved in any other event, (4) prompt the endpoint to determine if the endpoint wants to be included in the event VTG, and/or (5) apply hysteresis to delay including the endpoint in the event VTG.

Regardless of how an endpoint is added, as each endpoint joins the event VTG the IS may need to modify how communications within the event VTG are propagated. For example, if firefighter 214a is using a cell phone and guard 216 is using a PSTN phone the IS may only need to use a conference-call feature to facilitate communications between firefighter 214a and guard 216. Then, as the event area expands and officer 210a, who is using a LMR, is added to the event VTG the IS may have to modify the phone conference used for the initial event VTG to include PTT communications. In some instances the IS may have to increase the resources (e.g. bandwidth) being used by a particular event VTG to facilitate the communications of an increasing number of endpoints.

In some embodiments, the IS may add more endpoints than just those endpoints within the event area. For example, assume that endpoints 212a-212c are members of a paramedic VTG. When the event area has expanded to include paramedic 212a the IS may include all the paramedics of the paramedic VTG even though paramedics 212b and 212c may not yet be within the event area. This may be useful where, for example, someone has been injured and needs a paramedic but paramedic 212a is unavailable because he is already responding to a different event.

Once an endpoint has been added to the event VTG that endpoint may send and receive messages with other endpoints in the event VTG as though they were all on the same communication network. Furthermore, the endpoint may be provided with additional information, through an update channel, regarding the event or the event subject. For example, the IS may broadcast whisper messages that contain updated information as to the status of the event, the event group and/or the event subject. Similarly recorded messages may be played as, or before, an endpoint joins the event VTG. The IS may also send a text message with the updated information, where the text message may be a message that: (1) scrolls along the bottom of display 400, (2) appears in a different display window, or (3) is sent to a different endpoint associated with the same user. The update channel may comprise its own signal or it may be embedded within a signal used for oral communications.

At some point the IS may receive an update as to the event subject's location. The updated location may be received from a variety of sources such as from an endpoint within the event VTG, an endpoint not within the event VTG, or a sensor. After the event subject has been spotted, for example, by endpoint 210h, the event area may be relocated based on the new location, event location 213t2. It should be noted that the mere relocation of the event area may not affect the functioning of the event VTG. Because the event subject has been spotted at a particular location not only may event area 431 be relocated it may also be reduced in size. For example, assume that the event area starts with a one mile radius and that six minutes later the event area has a five mile radius. Now, assume that a report is received indicating that the event subject is four miles north of the center of the event area. In response, the event area may be moved to the new location and reduced in size. This is because the IS may not have to account for the possibility of the event subject being south of the center of the event area because it knows that the event subject is to the north. This may be useful in reducing the number of endpoints within the event VTG when there are large gaps between the receipt of updated location information and/or when there are large numbers of endpoints within the event VTG. More specifically, it may remove those endpoints that are not within a useful proximity of the event subject and thus are not meaningfully participating in the event VTG.

In some embodiments, the IS may remove all the endpoints that are not within updated event area 402, thus officers 210a-210f, 212a-212c, 214a-214c and 216 may be removed from the event VTG but officers 210g and 210h may remain. In removing the endpoints the IS may send a notice informing the endpoint that they are no longer a part of the event VTG. The notice may include a prompt that would provide the endpoint with the option to elect to remain a part of the event VTG. Similarly, a notice or prompt may be sent before an endpoint is added to the event VTG. In some embodiments, the IS may not completely remove an endpoint from the event VTG, but may instead change the endpoints privileges, for example by only allowing the endpoint to listen to the event VTG.

Figure 5:
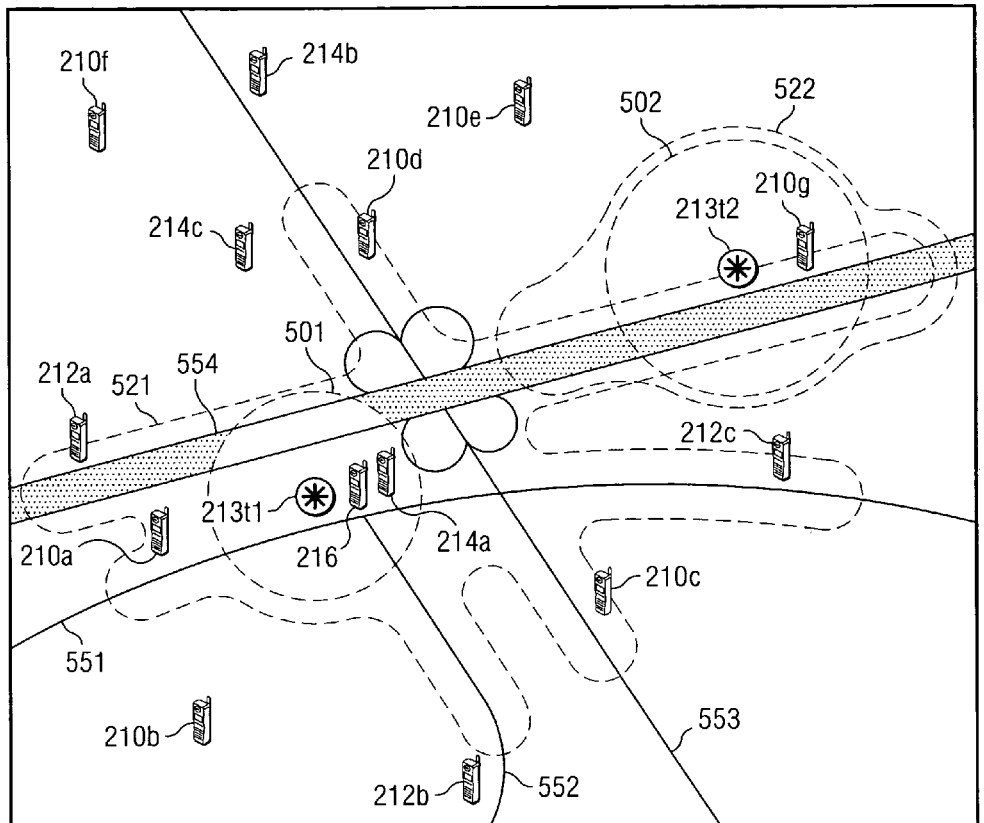
FIG. 5 illustrates an example display wherein an event area expanded non-uniformly, in accordance with a particular embodiment.

FIG. 5 is similar in most respects to FIG. 4, however the event area depicted in FIG. 5 expands in a non-uniform manner, as opposed to the uniform manner of FIG. 4. Thus event areas 521 and 522 have an amorphous shape that reflects the speed associated with the various roads on which the event subject may be fleeing. The speed associated with a particular road may be a posted speed limit, an average speed of traffic, an observed speed of traffic or any other indicator that may be relevant in determining the likely rate of travel along that road. For example, if the event subject was spotted at the corner of a freeway running east/west and an access road running north/south, the event area may expand faster in the east/west direction than it would in the north/south direction because the speed of the freeway is greater than the speed of the access road. One possible situation in which the event subject may be moving is where the event is an Amber Alert in which the event subject, the abductor, is trying to drive away.

In the area depicted in display 500 there are four roads, roads 551-554. Each of these roads has a different speed associated with it, with road 554 being a freeway and having the highest speed and road 552 being an access road and having the lowest speed. Accordingly, as the event area expands, it will expand faster along the general area of freeway 554 than it will in any other direction. Furthermore, while access road 552 has the lowest associated speed, the event area will still expand faster in the general area of access road 552 than it will in an area that is void of any road. This accounts for the possibility that if the event subject is not on a defined road he may be traveling slower, or he may no longer be driving. The effect of taking into account the speed associated with a particular road can be seen in the differences between event areas 501 and 521, and event areas 502 and 522. Notice that event area 502 is substantially circular, while event area 522 has a rounded protrusion extending along freeway 554 reflecting the increased speed of freeway 554 compared to the surrounding area.

It should be noted that, like initial event area 401 of FIG. 4, the initial event area 501, while substantially circular and centered about event location 213t1 in FIG. 5, may, in other embodiments, be of any desired shape, size or location. Initial event area 501 may, for example, have an initial shape that reflects the varying speeds the event subject may travel in particular directions. Additionally, while display 500 only depicts roads, in some embodiments the IS may account for natural pathways such as rivers, canyons or mountain ridges.

While event areas 521 and 522 expanded based on the speed associated with the nearby road, other factors may be used in determining how the event area is expanded. The following are just a few of the possible ways an event area may expand in a non-uniform manner: (1) the reported speed of the event subject, (2) the actual speed of traffic on the road (e.g. where traffic monitors report current speed on a road), (3) average speed of traffic on the road, where the average speed may be based on the time of day, the day of the week and/or the time of year, or (4) terrain/obstacles (e.g. the speed may be lower in a forest or up a hill than in a field or down a hill). The IS may further be configured to ignore certain roads. For example, if the event subject is on a train, the IS may ignore roads used by automobiles, or where the subject is on a freeway the IS may ignore roads that do not have off ramps.

With the exception of how the event area expands, the IS associated with display 500 may function similarly to the IS associated with display 400 in terms of adding and removing endpoints and facilitating communications between endpoints within the event VTG. Just as in FIG. 4, the event area can be used to aid in the determination of which endpoints to include in the event VTG.

It will be recognized by those of ordinary skill in the art that endpoints and interoperability systems disclosed herein are merely example configurations in accordance with particular embodiments. These systems may include any number of interfaces, processors, memory modules, and other components to accomplish the functionality and features described herein. In addition, these components and other desired components for performing the above described functionality may be centrally located (local) with respect to one another, or distributed throughout communication systems and networks. In addition, one or more components of these systems and devices may work together in performing various functionality described herein.

Figure 6:
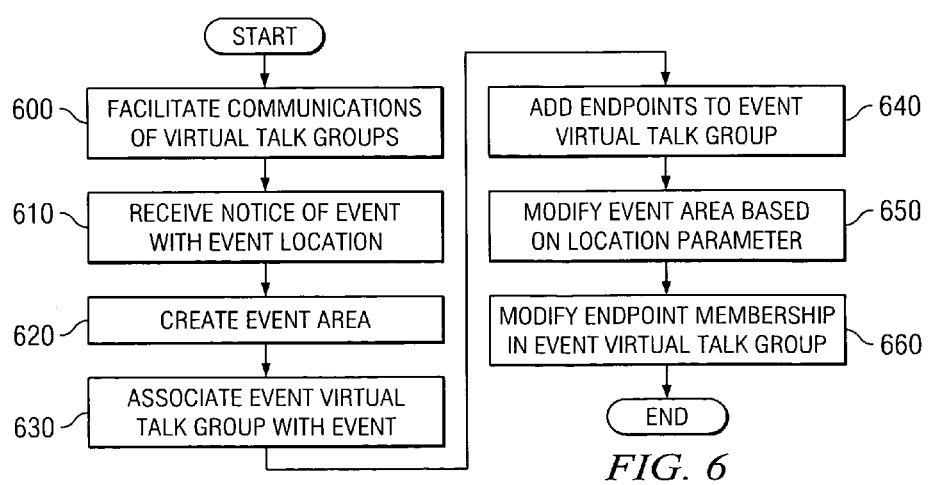
FIG. 6 illustrates a method for providing interoperable communications with dynamic event area allocation.

FIG. 6 is a flowchart illustrating a method for providing interoperable communications with dynamic event area allocation, in accordance with a particular embodiment. The method begins at step 600 where communications from a plurality of virtual talk groups are received. The virtual talk groups may each comprise a plurality of endpoints of different communication networks. It should be understood that for purposes of the descriptions and claims herein, whenever a VTG is described as comprising a plurality of endpoints of different communication networks, in addition to including at least some endpoints of different communication networks, the VTG may also include some endpoints of the same communication network. For example, the VTG may include a plurality of endpoints of the same police department network in addition to one or more endpoints of other communication networks, such as other police or fire department or private company networks. Moreover, in some cases, endpoints of different communication networks may include endpoints that are communicating on different channels or frequencies. The different communication networks may comprise networks of different technologies, such as IP, cellular, PSTN, LMR, CDMA, GSM, TDMA, GPRS and satellite. In particular embodiments, at least some of the endpoints of the virtual talk groups may communicate through PTT technology. In addition, some of the endpoints may comprise IP endpoints. Moreover, the different communication networks may comprise networks of various safety and security agencies, whether public or private, as well as networks of public and private groups, companies or organizations. The communications may be received at an IS and/or at a client application of an IS.

The virtual talk groups may include communications (from the various endpoints) that are facilitated by an IS by mapping the communications to a multicast IP address or by bridging the communications at a multipoint conference system of the IS.

At step 610, a notice of an event is received. The location of the event may either be included with the notice of the event or it may be received separate from the notice of the event. The notice of an event may be received from an automated device such as an alarm or from a report from an endpoint, such as a police officer 'radioing' what he saw. The location of the event included in the notice may be encoded within the message (e.g. GPS information included with communication), included within the report from the endpoint (e.g. user states his location), determined from a database (e.g. a database that associates street addresses with phone numbers) or any other manner of relaying location information. In some embodiments the location of the event may be received after receiving the notice of the event. For example, an officer involved in a high speed chase may not initially know his location until after he drives pass a street sign. In some embodiments the location information may come from a source different than the source that reported the event. For example, in the case of a hostage situation, it may be that two hostages are able to call but one of the hostages may not presently be able to talk but has called from a phone with a known location, and the other hostage is able to talk but does not know his location and is calling from a phone whose location is unknown.

At step 620, an event area is created. The event area may be of any size or shape depending on the situation or configuration of the IS. The event area may be used as an estimation of where the event subject may be located based on certain assumptions as to the event subject rate of travel. The event may also be used to determine which endpoints are in the vicinity of the event subject and thus may be more likely to have information relevant to the event subject. Furthermore, as time passes the event area may expand and/or be relocated. This reflects the fact that as time passes the area in which the event subject may be in may increase (the more time that passes after the event subject's location was last known, the more area that the event subject may have fled to) or change (e.g. when an endpoint reports spotting the event subject at a particular location).

At step 630 an event virtual talk group is associated with the event. The event virtual talk group is a virtual talk group that facilitates the communication of messages concerning the event from endpoints of different networks. The event virtual talk group may have its own RF frequency, channel, IP address or any other resource it may need to facilitate the communications of the endpoints included therein. Furthermore, the event VTG may be a new VTG created specifically for the event, or it may be an existing VTG that is now being used for the event.

In some embodiments the event virtual talk group may include an event channel. Through the event channel, endpoints within the event virtual talk group may be quickly updated with information concerning the event. For example, the event channel may transmit an image depicting the event subject, or it may transmit a text message stating the nature of the event, or the last known direction the event subject was heading.

At step 640 endpoints are added to the virtual talk. The endpoints added to the event VTG may be those endpoints that are within the event area created at step 620. In some embodiments the IS may automatically add endpoints within the event area to the event VTG. In particular embodiments the IS may notify users within the event area that they are in the event area and present them with a prompt that would allow the endpoint to determine if it wants to be a part of the event VTG. In some embodiments, users not within the event area may be added to the event VTG. For example, a supervisor or dispatcher may be included in the event VTG even though he or she is not within the event area. Also, the IS may add a VTG (different than the event VTG), and all the endpoints therein, to the event VTG if one of the endpoints of the VTG is added to the event VTG. It should be noted that in the situation in which an existing VTG is used as the event VTG there may not be a need to add endpoints to the event VTG because the existing VTG may already include endpoints.

At step 650 the event area is modified based on a location parameter. A location parameter may be a new location for the event subject, an estimated speed of the event subject, or any other information that may be relevant to the actual or possible location of the event subject. The IS may use one or more location parameters in determining how the event area is to be modified. The location parameter may come from any number of sources coupled to the IS, such as traffic sensors, location information from endpoints, or the IS's own calculations. To better understand this, the following examples will illustrate some of the possible ways the IS can modify the event area based on a location parameter. It will be assumed, for simplicity, that the event area is initially a circle centered around the location of the event (the first known location of the event subject).

From the initial circle defining the event area the IS may generate its own location parameter that increases the size of the event area in a uniform manner over time. For example, the IS could increase the area such that the radius of the event area increases at a rate of 6 MPH. Thus, the event area would include any location of the event subject, regardless of which direction he traveled from the location of the event (assuming the event subject was not traveling faster than 6 MPH). This may be useful in the situation where the subject is traveling by foot and may not be following any predefined paths, such as sidewalks or streets.

In the situation in which the event subject may be following predefined paths, such as streets, the IS may generate its own location parameter that increases the size of the event area in a non-uniform manner. The non-uniformity may reflect the fact that if the event subject is limited to following predefined paths (e.g. the event subject is driving a car) it may be advantageous to increase the event area at a greater rate along roads than in areas where there are no roads. Furthermore, it may be advantageous to take into account different factors that may affect the speed of travel along a particular road. Some of the factors the IS may take into account include: (1) the speed limit associated with a particular road, (2) the average speed traffic actually moves on a particular road at a particular time of day, (3) the speed observed on a particular road, for example through a traffic camera, (4) the reported speed of the event subject, for example where a police officer reports that the subject is driving at 75 MPH, or (5) any other indicator, assumed, observed or detected that may be useful in determining the rate at which the event area should expand in any one direction.

The IS may receive a location parameter that includes an updated location of the event subject. This could come from an endpoint, for example where the user of an endpoint reports seeing the subject at a particular cross-street. When the IS receives a location parameter that updates the actual location of the event subject the IS may move the event area so that, for example, it is centered around the new location of the event subject. Depending on the situation, the IS may also reduce the size of the event area. This may be particularly useful in the scenario in which the subject is involved in a high speed chase (causing the event area to increase rapidly) and the actual location of the subject has not been updated for awhile. In this scenario the event area is likely to be very large which could entail including a large number of endpoints in the event VTG that are not meaningfully participating in the pursuit of the subject. Thus, when the location of the event subject is reported, the event area can be reduced in size because the IS now knows the location of the event subject. Note that once the event area has been moved it will resume its expansion.

At step 660 the membership of endpoints in the event virtual talk group is modified. The modification can be adding endpoints to the event VTG or removing endpoints from the event VTG. One possible reason an endpoint might be added to the event VTG is that the modified event area has expanded and the endpoint is now within the event area. Similarly, one possible reason for removing an endpoint from the event VTG may be that the event area is moved and resized based on an updated location and the endpoint may no longer be within the event area. Determining whether or not an endpoint is within the event area may be automated, such as when the endpoint transmits its location or the endpoint is at a fixed, known location, or it may done manually, such as when an the user states his location and the dispatcher adds her to the event VTG. It should be noted that in some embodiments a dispatcher may add or remove endpoints from the event VTG based on her own criteria, and in some embodiments an endpoint may decide that they do or do not want to be included within an event VTG.

In particular embodiments, the IS may use a form of hysteresis to delay a change in the status of an endpoint's membership in the event VTG. This may be useful where the event subject is constantly changing his direction of travel, thereby causing the event area to bounce around within a particular area. By employing hysteresis the IS may avoid having to repeatedly add and remove an endpoint to and from the event VTG where the endpoint is near the outer edge of an event area and the event subject is moving around within a small area.

In both steps 640 and 660, in which endpoints may be added to the event VTG, the IS may need to update or modify the method it uses to facilitate communications within the event VTG. Because the IS allows endpoints of different communication networks to be able to communicate as though they are part of the same communication network, each time an endpoint from a new communication network is added to the event VTG the IS may have to change the way in which inter-communication network transmissions are facilitated. For example, if the event VTG currently comprises endpoints sending push-to-talk messages received from LMR endpoints on different RF channels, when an endpoint on a cell phone is added to the event VTG, the IS will have to cause the PTT messages to be retransmitted to the cell phone and the cell phone messages to be retransmitted to the PTT endpoints.

As in other embodiments, a virtual talk group may comprise endpoints utilizing different technologies. In particular embodiments, at least some of the endpoints may communicate through PTT technology. In addition, some of the endpoints may comprise IP endpoints. Moreover, the different communication networks may comprise networks of various safety and security agencies, whether public or private as well as networks of public and private groups, companies or organizations.

Some of the steps illustrated in FIG. 6 may be combined, modified or deleted where appropriate, and additional steps may also be added to the flowchart. Additionally, steps may be performed in any suitable order without departing from the scope of the invention.

While various implementations and features are discussed with respect to multiple embodiments, it should be understood that such implementations and features may be combined in various embodiments. For example, features and functionality discussed with respect to a particular figure such as one of FIG. 4 or 5 may be used in connection with features and functionality discussed with respect to another such figure according to operational needs or desires.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 10 and illustrated endpoints and interoperability systems, these elements may be combined, rearranged or positioned in order to accommodate particular routing architectures or needs. In addition, any of these elements may be provided as separate external components to communication system 10 and illustrated endpoints and interoperability systems, or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A computer-implemented method for interoperable communications with a dynamic event area executable on a processor, comprising:
   facilitating communications of a plurality of virtual talk groups, each virtual talk group comprising a plurality of endpoints of different communication networks communicating using a respective communication protocol;
   receiving notice of an event comprising an event location, the event associated with a subject at a first location;
   creating an event area based on the event location;
   associating an event virtual talk group with the event for communications regarding the event;
   receiving updated location information associated with the subject;
   associating a roadway with the event area based on the updated location information associated with the subject; and
   automatically modifying the event area based at least on speed limit information of the roadway, wherein automatically modifying the event area based at least on speed limit information of the roadway comprises automatically modifying the event area based on speed limit information irrespective of a speed of the subject.

2. The method of claim 1, wherein automatically modifying the event area based at least on speed information of the roadway comprises uniformly expanding the event area outward based at least on speed information of the roadway.

3. The method of claim 1, wherein automatically modifying the event area based at least on speed information of the roadway comprises expanding the event area outward in a non-uniform manner based at least on speed information of the roadway.

4. The method of claim 1, further comprising creating an update channel for providing endpoints within the event virtual talk group with information relating to the event and the subject of the event.

5. The method of claim 1, further comprising:
receiving a notice updating a location of the subject of the event; and
modifying the event area based on the updated location of the subject of the event.

6. The method of claim 1, further comprising notifying endpoints within the event area that they are within the event area.

7. The method of claim 1, further comprising adding endpoints within the modified event area to the event virtual talk group.

8. The method of claim 1, further comprising removing endpoints from the event virtual talk group not within the modified event area.

9. The method of claim 1, further comprising adding endpoints of a first virtual talk group, of the plurality of virtual talk groups, to the event virtual talk group.

10. The method of claim 1, further comprising adding capacity to the event virtual talk group based on the modified event area.

11. A system for interoperable communications with a dynamic event area, comprising:
an interface operable to:
facilitate communications of a plurality of virtual talk groups, each virtual talk group comprising a plurality of endpoints of different communication networks communicating using a respective communication protocol; and
receive notice of an event comprising an event location, the event associated with a subject at a first location; and
a processor coupled to the interface and operable to:
create an event area based on the event location;
associate an event virtual talk group with the event for communications regarding the event;
receive updated location information associated with the subject
associate a roadway with the event area based on the updated location information associated with the subject; and
automatically modify the event area based at least on speed limit information of the roadway.

12. The system of claim 11, wherein the processor operable to automatically modify the event area based at least on speed information of the roadway comprises a processor operable to uniformly expanding the event area outward based at least on speed information of the roadway, wherein automatically modifying the event area based at least on speed limit information of the roadway comprises automatically modifying the event area based on speed limit information irrespective of a speed of the subject.

13. The system of claim 11, wherein the processor operable to automatically modify the event area based at least on speed information of the roadway comprises a processor operable to expand the event area outward in a non-uniform manner based at least on speed information of the roadway.

14. The system of claim 11, wherein the processor is further operable to create an update channel for providing endpoints within the event virtual talk group with information relating to the event and the subject of the event.

15. The system of claim 11, wherein:
the interface is further operable to receive a notice updating a location of the subject of the event; and
the processor is further operable to modify the event area based on the updated location of the subject of the event.

16. The system of claim 11, wherein the interface is further operable to notify endpoints within the event area that they are within the event area.

17. The system of claim 11, wherein the processor is further operable to add endpoints within the modified event area to the event virtual talk group.

18. The system of claim 11, wherein the processor is further operable to remove endpoints from the event virtual talk group not within the modified event area.

19. The system of claim 11, wherein the processor is further operable to add endpoints of a first virtual talk group, of the plurality of virtual talk groups, to the event virtual talk group.

20. The system of claim 11, wherein the processor is further operable to add capacity to the event virtual talk group based on the modified event area.

21. Logic embodied in a computer readable medium, the computer readable medium comprising code operable to:
facilitate communications of a plurality of virtual talk groups, each virtual talk group comprising a plurality of endpoints of different communication networks communicating using a respective communication protocol;
receive notice of an event comprising an event location, the event associated with a subject at a first location;
create an event area based on the event location;
associate an event virtual talk group with the event for communications regarding the event;
receive updated location information associated with the subject
associate a roadway with the event area based on the updated location information associated with the subject; and
automatically modify the event area based at least on speed limit information of the roadway.

22. The medium of claim 21, wherein the code operable to automatically modify the event area based at least on speed information of the roadway comprises code operable to uniformly expand the event area outward based at least on speed information of the roadway.

23. The medium of claim 21, wherein the code operable to automatically modify the event area based at least on speed information of the roadway comprises code operable to expand the event area outward in a non-uniform manner based at least on speed information of the roadway, wherein automatically modifying the event area based at least on speed limit information of the roadway comprises automatically modifying the event area based on speed limit information irrespective of a speed of the subject.

24. The medium of claim 21, further comprising code operable to create an update channel for providing endpoints within the event virtual talk group with information relating to the event and the subject of the event.

25. The medium of claim 21, further comprising code operable to:
receive a notice updating a location of the subject of the event; and
modify the event area based on the updated location of the subject of the event.

26. The medium of claim 21, further comprising code operable to notify endpoints within the event area that they are within the event area.

27. The medium of claim 21, further comprising code operable to add endpoints within the modified event area to the event virtual talk group.

28. The medium of claim 21, further comprising code operable to remove endpoints from the event virtual talk group not within the modified event area.

29. The medium of claim 21, further comprising code operable to add endpoints of a first virtual talk group, of the plurality of virtual talk groups, to the event virtual talk group.

30. The medium of claim 21, further comprising code operable to add capacity to the event virtual talk group based on the modified event area.

31. A system for interoperable communications with a dynamic event area, comprising:

means for facilitating communications of a plurality of virtual talk groups, each virtual talk group comprising a plurality of endpoints of different communication networks communicating using a respective communication protocol;

means for receiving notice of an event comprising an event location, the event associated with a subject at a first location;

means for creating an event area based on the event location;

means for associating an event virtual talk group with the event for communications regarding the event;

means for receiving updated location information associated with the subject;

means for associating a roadway with the event area based on the updated location information associated with the subject; and means for automatically modifying the event area based at least on speed limit information of the roadway, wherein automatically modifying the event area based at least on speed limit information of the roadway comprises automatically modifying the event area based on speed limit information irrespective of a speed of the subject.

\* \* \* \* \*